United States Patent
Wagner-Stürz

(10) Patent No.: US 12,117,099 B2
(45) Date of Patent: Oct. 15, 2024

(54) METHOD FOR TESTING THE FUNCTIONALITY OF A SOLENOID VALVE FOR TRIGGERING A SAFETY VALVE

(71) Applicant: SAMSON AKTIENGESELLSCHAFT, Frankfurt am Main (DE)

(72) Inventor: David Wagner-Stürz, Mühltal (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 372 days.

(21) Appl. No.: 17/786,457

(22) PCT Filed: Dec. 17, 2020

(86) PCT No.: PCT/EP2020/086838
§ 371 (c)(1),
(2) Date: Jun. 16, 2022

(87) PCT Pub. No.: WO2021/123029
PCT Pub. Date: Jun. 24, 2021

(65) Prior Publication Data
US 2023/0015389 A1    Jan. 19, 2023

(30) Foreign Application Priority Data
Dec. 19, 2019 (DE) ..................... 10 2019 135 327.0

(51) Int. Cl.
*F15B 19/00*    (2006.01)
*F15B 20/00*    (2006.01)
(Continued)

(52) U.S. Cl.
CPC ........ *F16K 37/0066* (2013.01); *F15B 19/005* (2013.01); *F15B 20/008* (2013.01); *F16K 31/423* (2013.01); *F15B 2211/8752* (2013.01)

(58) Field of Classification Search
CPC ............ F15B 19/005; F15B 2211/8753; F15B 20/008; F16K 31/423; F16K 37/0083; G05B 23/0256
See application file for complete search history.

(56) References Cited

U.S. PATENT DOCUMENTS

| | | |
|---|---|---|
| 8,540,211 B2 | 9/2013 | Wheater et al. |
| 10,041,610 B2 | 8/2018 | Junk et al. |

(Continued)

FOREIGN PATENT DOCUMENTS

| | | |
|---|---|---|
| DE | 19924377 B4 | 12/2004 |
| DE | 102008045775 A1 | 3/2010 |

(Continued)

OTHER PUBLICATIONS

International Search Report for PCT/EP2020/086838 mailed Apr. 8, 2021.

*Primary Examiner* — Jennifer Bahls
(74) *Attorney, Agent, or Firm* — GrowIP Law Group LLC

(57) ABSTRACT

The disclosure provides a method for testing a solenoid valve for triggering a safety valve having a single-acting fluidic drive and a positioner. The drive fluid pressure is increased by a first pressure difference. An attempt is made to switch the solenoid valve to the safety position. The drive fluid pressure is measured at a specified point in time that is selected such that the pressure in the drive fluid lowers at most by the first pressure difference. If the pressure in the drive fluid is higher than a reference pressure at the specified point in time, the functionality test of the solenoid valve is failed. The lowering of the pressure in the drive fluid is monitored over a defined period of time to make conclusions regarding the pressure generating system. The pressure does not fall below the operating pressure so the position of the valve member remains constant.

20 Claims, 3 Drawing Sheets

(51) Int. Cl.
 *F16K 31/42* (2006.01)
 *F16K 37/00* (2006.01)

(56) References Cited

U.S. PATENT DOCUMENTS

| | | |
|---|---|---|
| 10,234,058 B2 | 3/2019 | Junk et al. |
| 10,240,687 B2 | 3/2019 | Junk et al. |
| 2010/0050786 A1 * | 3/2010 | Kiesbauer .......... G05B 23/0256 |
| | | 73/862.583 |
| 2011/0114191 A1 | 5/2011 | Wheater et al. |

FOREIGN PATENT DOCUMENTS

| | | | | |
|---|---|---|---|---|
| EP | 3220221 A1 * | 9/2017 | ............ | F15B 19/005 |
| WO | 2007087030 A1 | 8/2007 | | |

* cited by examiner

METHOD FOR TESTING THE FUNCTIONALITY OF A SOLENOID VALVE FOR TRIGGERING A SAFETY VALVE

CROSS-REFERENCE TO RELATED APPLICATIONS

This application is a U.S. National Stage Application that claims the benefit of the filing date of International PCT Application No. PCT/EP2020/086838, filed Dec. 17, 2020, that claims priority to German Patent Application No. DE102019135327, filed on Dec. 19, 2019, which are hereby incorporated by reference in their entirety.

FIELD OF THE INVENTION

The invention relates to a method for testing the operability of a solenoid valve for triggering a safety valve, as well as a corresponding device. Such methods serve to ensure the operational safety of a plant by ensuring that a safety valve is actually triggered in the event of a safety-relevant situation. With such a method, the maintenance intervals for plants with safety valves may be optimized, if required.

BACKGROUND

In the chemical industry, for example, the operability of safety valves must be checked regularly. In order to be able to guarantee the operability of a safety valve, both the solenoid valve, which is used to trigger the safety valve, and the actual safety valve must work reliably.

Safety valves are actuated, for example, by an actuator that is operationally coupled to a solenoid valve in conjunction with a control system. The actuator is typically a single-acting fluidic actuator. The actuator comprises, for example, a piston or diaphragm arranged in a chamber and coupled to a spring. When the pressure in the chamber exerts a force on the piston that is greater than or equal to a preset load on the spring, this pressure prevents the spring, and thus the actuator, from being actuated, thereby holding the safety valve in the operating position. When the pressure in the chamber falls below the load of the spring, the spring causes the piston in the chamber to be actuated. In that case, the actuator moves the safety valve from the operating position to the safety position.

In some cases, the position of the actuator is controlled by the solenoid valve. For example, the solenoid valve vents the actuator when an emergency signal is received from the control and a dangerous condition is detected. For this purpose, the solenoid valve releases, for example, a connection between the actuator and the ambient air which reduces the pressure in the actuator. Since a safety valve usually has to be triggered quickly in the event of danger, the cross-section released in the process is typically relatively large, so that the pressure can be reduced within a specified, short time.

Part of the check on the operability of a safety valve is carried out by means of a partial stroke test (PST). This involves moving the valve member by approx. 10 to 15% of its stroke while the plant is running. This does not significantly affect the operation of the plant, but the mobility of the valve member is verified. This eliminates the most common faults. This test determines the operability of the drive or actuator for the valve member; a partial stroke test is not suitable for checking the function of a solenoid valve used to trigger the safety valve.

In the publication U.S. Pat. No. 10,240,687 B2, methods and devices for testing a solenoid valve of a safety valve by means of a positioner are disclosed. For this purpose, the solenoid valve is caused to change from a first state to a second state, i.e. to trip, during a predetermined pulse duration. The positioner determines whether the solenoid valve is functioning by measuring the maximum pressure change in the actuator of the safety valve during the pulse duration. If it is determined that the solenoid valve is in a functioning state, the positioner then also performs a partial stroke test of the safety valve.

The publication DE 10 2008 045 775 A1 also describes a method for monitoring the operability of a safety valve that is controlled by a solenoid valve. The solenoid valve is switched with a fixed switching time, which is supposed to be short enough that the position of the safety valve remains essentially constant, but long enough that a pressure drop can be measured.

A method for checking the functioning of a solenoid valve is also known from the publication WO 2007/087030 A1. A digital valve control, an open/close valve and two pressure sensors are present, which are connected to a pneumatic actuator and a solenoid valve. To test the solenoid valve, the valve controller can measure the pressure at various ports of the solenoid valve when the solenoid valve is actuated for a very short period of time. The valve controller can determine whether the solenoid valve is operational based on the rate of change of the difference between the measured pressure signals over time.

Similar methods and devices are also known from publications U.S. Pat. Nos. 10,041,610 B2 and 10,234,058 B2.

The publication U.S. Pat. No. 8,540,211 B2 describes a method for a partial stroke test for a safety valve, in which properties of the fluid flow serve as the abort criterion. Here, too, a solenoid valve can be used to control the safety valve. However, its operability is not tested separately.

The disadvantage with such arrangements and methods is that it is not possible to determine the operability of the solenoid valve without changing the position of the valve member of the safety valve.

From the publication DE 199 24 377 B4, a diagnostic system for a valve actuatable by a positioner via an actuator is known. This is based on recording a structure-borne sound spectrum when the valve is slightly open and comparing the structure-borne sound with the recorded spectrum when the valve is closed, in order to be able to conclude whether the valve may be leaking. No specific reference to safety valves is provided. In particular, testing the operability of a solenoid valve is not envisioned.

SUMMARY

Problem

The purpose of the disclosure is to provide a method and a device which enable testing of the solenoid valve of a safety valve without moving the valve member of the safety valve.

Solution

This problem is solved by the subject matter of the independent claim. Advantageous embodiments of the subject matter of the independent claim are indicated in the sub-claims. The wording of all claims is hereby incorporated in this description by reference.

The use of the singular shall not exclude the plural, which shall also apply in the reverse sense, unless otherwise disclosed.

Individual method steps are described in more detail below. The steps need not necessarily be carried out in the order given, and the method to be described may also include further, unmentioned steps.

To solve the problem, a method for testing the operability of a solenoid valve for triggering a safety valve is proposed. As prerequisites, the safety valve has a single-acting fluidic drive for a valve member—with a drive fluid—and a positioner that determines the pressure in the drive fluid and regulates the position of the valve member. The valve member assumes a safety position when the pressure in the drive fluid corresponds to an ambient pressure and assumes an operating position when the pressure in the drive fluid corresponds to an operating pressure. The solenoid valve leaves the pressure in the drive fluid unaffected in an operating position, while it decreases the pressure in the drive fluid in a safety position. The method comprises the following steps:

Should the valve member not be in its operating position, it is moved thereto.

The pressure in the drive fluid is increased above the operating pressure by a first pressure difference. In particular, the operating pressure is thus lower than the maximum possible pressure in the drive.

An event is triggered as a result of which the solenoid valve should assume its safety position. Typically, the power supply to the solenoid valve is interrupted for this purpose.

The pressure in the drive fluid is measured continuously and/or at a predetermined point in time after the triggering event, the predetermined point in time being chosen such that the pressure in the drive fluid drops at most by the first pressure difference. The pressure in the drive fluid at this time should therefore not be lower than the previously applied operating pressure.

Either the test of the operability of the solenoid valve is considered failed if the pressure in the drive fluid at the predetermined point in time is higher than an associated reference pressure.

Or the test of the operability of the solenoid valve is considered passed and is aborted as soon as the pressure during the continuous measurement before or at the predetermined point in time is lower than the reference pressure.

The operating pressure, for example, can be selected as the reference pressure—this case is particularly simple. Both the reference pressure and the predetermined point in time can be provided with a tolerance, e.g. 2% or 5%. Naturally, this tolerance is only significant upwards for the reference pressure.

Such a method enables to check the basic operability of the solenoid valve and, in particular, to ensure that it switches—if necessary—to the safety position and actually reduces the pressure in the actuator of the safety valve in this state. Appropriately selecting the predetermined point in time also allows to monitor the lowering of the pressure in the drive fluid over a defined time period, not merely for the indefinite duration of a pulse must be as short as possible. This may also allow conclusions to be drawn about the condition of the pressure generation system for the drive fluid. If the pressure in the drive fluid does not fall below the reference pressure even when the predetermined point in time is reached, the test is considered failed. Should this occur, it is possible, for example, to additionally investigate whether the air output in the compressed air system is too low, i.e. in particular whether the pressure is not reduced quickly enough, e.g. due to clogged filters.

The fact that the pressure in the drive fluid is initially increased by the first pressure difference also ensures that it does not drop below the operating pressure when the operability of the solenoid valve is checked. This ensures that the actuator of the safety valve does not move, but that the position of the valve member remains constant. The process or operation of the plant containing the safety valve is therefore not affected by this test.

In addition, due to the larger pressure difference compared to other test methods for solenoid valves, a change in the venting speed (air output) of the system can be better detected. In the event of a fault, this opens up further diagnostic possibilities and/or conclusions concerning the cause of the fault.

The method becomes particularly simple if the first pressure difference is the difference between the maximum possible pressure in the drive fluid and the operating pressure.

In this simple case, the first pressure difference can be determined after the drive was pressurized to the maximum possible pressure and this pressure was measured. It is therefore not necessary to specify a first pressure difference before starting the method.

The pressure in the drive fluid of the safety valve can be prevented from dropping below the operating pressure with especially high certainty if a second pressure difference is formed by multiplying the predetermined first pressure difference by a factor that is less than 1, and if the at least one predetermined point in time is selected such that the pressure in the drive fluid decreases at most by the second pressure difference. The pressure in the drive fluid then only drops to a value that is above the operating pressure, so that there is a certain safety margin. In this way, a movement of the safety valve as a result of the test of the operability of the solenoid valve can be ruled out with a particularly high degree of certainty.

Preferably, the drive for the valve member is pneumatic. Pneumatically driven valves are generally known and can fulfill all necessary requirements for safety-relevant applications. The method according to the disclosure is particularly suitable for testing the operability of solenoid valves that trigger the safety case in a pneumatic actuator of a safety valve.

In a one embodiment of the method, a first execution of the method on the solenoid valve of a safety valve serves as a reference measurement. The operating pressure and the first pressure difference and/or the maximum achievable pressure in the drive of the safety valve are determined and stored as reference values. The time required for the pressure in the drive to drop by the first pressure difference is also determined and stored as a reference value. This provides a maximum value for the at least one predetermined point in time. In this way, it is easy to determine a reasonable value for the predetermined point in time, based, for example, on the ratio of the first pressure difference of a later test to the reference value for the first pressure difference. A predetermined tolerance may be added to the reference values if necessary (e.g. 2%), as has previously been mentioned.

Preferably, the test of the operability of the solenoid valve is considered passed if the pressure in the drive fluid is lower than the reference pressure at the at least one predetermined point in time. Then the test shows that the solenoid valve switches in such a way that the pressure in the drive fluid is reduced by a sufficient amount within the time up to the predetermined point in time, specifically down to the reference pressure.

Movement of the actuator of the safety valve is avoided with a particularly high certainty if the reference pressure is higher than the operating pressure and is determined with the aid of the second pressure difference. In particular, the reference pressure can then be given by operating pressure+ first pressure difference−second pressure difference, or preferably maximum pressure−second pressure difference. In this way, it is particularly safely excluded that the operability test according to the disclosure impairs the operation of the plant or the process. As already described above, a specified tolerance can be added to the reference values, in particular to the reference pressure, if necessary (e.g. 2%; for the reference pressure, only the upward tolerance is relevant).

A more precise diagnosis is possible if, as criteria for testing the operability of the solenoid valve, an acoustic signal or a current curve of the solenoid valve also prove the operability thereof. In particular, this enables further diagnostic options if the criteria relating to the pressure in the drive fluid are not reached at the predetermined point in time, since it is possible in this way to determine whether the problem is to be found in the solenoid valve itself or, for example, in the compressed air system.

Complicated setups with additional control and/or regulating units can be avoided if the method according to the disclosure runs on the positioner of the safety valve.

This is further facilitated if pressure sensors are provided in the positioner to measure the pressure in the drive fluid.

In order to return the safety valve to its normal operating condition, it is advantageous if the following further steps are carried out following the method described above: After the solenoid valve has been tested for operability, an event is triggered, as a result of which the solenoid valve resumes its operating position; and the positioner regulates the pressure in the drive fluid back to the operating pressure.

Testing the operability of a safety valve in a plant can be made particularly efficient if, following the method described above for testing the operability of a solenoid valve for triggering a safety valve, a partial stroke test is carried out on the safety valve as a further step.

The problem is further solved in that in a method as described above, the method steps are formulated as program code with which the method can run on at least one computer.

Furthermore, the problem is solved by a computer program comprising executable instructions which perform the method described above when executed on a processing unit, a microcontroller, DSP, FPGA or computer or on a plurality thereof in a network Furthermore, the problem is solved by a computer program having program code means for performing the method according to the disclosure in any one of its embodiments when said computer program is executed on a processing unit, a microcontroller, DSP, FPGA or computer or on a plurality thereof in a network. In particular, the program code means may be instructions stored on a computer-readable data storage medium.

Furthermore, the problem is solved by a data storage medium on which a data structure is stored which, after being loaded into a working and/or main memory of a processing unit, microcontroller, DSP, FPGA or computer or a plurality thereof in a network, can perform the method according to the disclosure in any one of its embodiments.

The problem is also solved by a computer program product with program code means stored on a machine-readable storage medium for performing the method according to the disclosure in any one of its embodiments when the program is executed on a processing unit, a microcontroller, DSP, FPGA or computer or on a plurality thereof in a network. In this context, a computer program product is understood to be the program as a tradable product. In principle, it may be in any form, for example on paper or a computer-readable data storage medium, and may in particular be distributed via a data transmission network.

Finally, the problem is solved by a modulated data signal comprising instructions executable by a processing unit, microcontroller, DSP, FPGA or computer, or by a plurality thereof in a network, for performing the method according to the disclosure in any one of its embodiments.

A computer system for performing the method can be a single computer or microcontrollers, DSPs or FPGAs, as well as a network of microcontrollers, DSPs, FPGAs or computers, for example an in-house, closed network, or computers that are connected to each other via the Internet. Furthermore, the computer system can be realized by a client-server constellation, where parts of the invention run on the server, others on a client.

Furthermore, the problem is solved by a device with means for performing a method as described above.

Further details and features result from the following description of disclosed embodiments in combination with the figures. The respective features may be implemented individually or in combination with each other. The possibilities of solving the problem are not limited to the embodiments. For example, range specifications always include all—not mentioned—intermediate values and all conceivable subintervals.

BRIEF DESCRIPTION OF THE FIGURES

Embodiments are shown schematically in the figures. Identical reference numerals in the individual figures denote identical or functionally identical elements or elements that correspond to one another in terms of their functions. Specifically.

DETAILED DESCRIPTION

Figure 1:
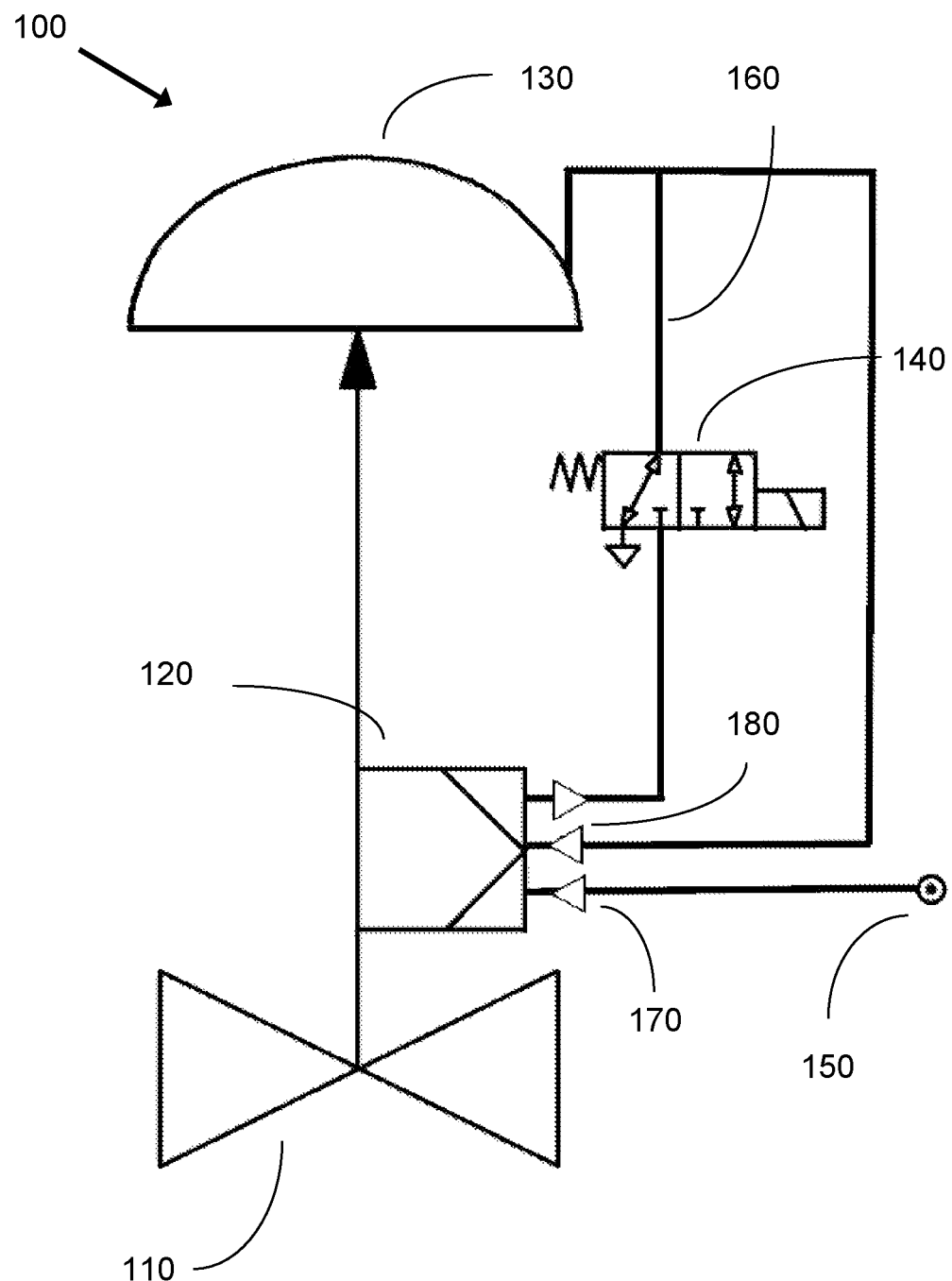
FIG. 1 shows a schematic representation of a safety valve with solenoid valve, for which a method according to the disclosure can be used.

FIG. 1 shows the schematic structure of a typical safety valve 100. This includes the actual valve 110 with the valve member, which is actuated by means of a pneumatic actuator 130. In an emergency, the pressure conditions in the actuator are controlled by the solenoid valve 140. The solenoid valve is energized during normal operation (the power supply is not shown). If the power supply to solenoid valve 140 is interrupted, it switches to its safety position and releases a connection from the actuator to the atmosphere, causing the pressure in the actuator to drop to ambient pressure and moving valve 110 to the safety position. This condition can be seen in the schematic diagram of FIG. 1: the left valve position is active, in which the control line 160 between the positioner 120 and actuator 130 is interrupted and instead a connection of the actuator to the atmosphere is switched, indicated by the arrow at the bottom left of the solenoid valve 140. If the solenoid valve 140 were in its operating position, the right half would be active, releasing the control line 160 between the positioner 120 and actuator 130.

The positioner 120 is mounted on the safety valve 100 and controls the stroke position of the valve member and the pressure 180 in the actuator. The positioner 120 is capable of briefly interrupting the power supply to the solenoid valve 140 in order to perform a test of the operability of the solenoid valve 140. A compressed air supply to the positioner 120 is shown by a supply air line 150. The actuator 130 is connected to the positioner 120 via the control connection line 160. Downstream of the solenoid valve 140, the pressure is further fed to the measuring port 180 of the positioner 120. The pressure in the supply air line 150 is determined by means of the pressure sensor 170.

Since the supply pressure fluctuates and the actuator pressure can also change as a result of changes in the process or due to friction, the first implementation of the method according to the disclosure on a specific safety valve is used as a reference for this safety valve. This means that a pressure difference and the associated time required to reduce this pressure difference are stored as reference values. Thus, the time for this defined pressure drop is determined. With each further execution, the occurring pressure differences are always compared with the stored reference values.

Each time the method according to the disclosure is performed, the starting or operating pressure $p_{start}$ is first measured via sensor 180. An exemplary pressure curve is shown schematically in FIG. 2. From the start time $t_{start}$, the actuator 130 is completely pressurized by the positioner to the maximum supply pressure $p_1$. Subsequently, the maximum pressure difference $$dp=p_1-p_{start}$$

and the modified pressure difference f*dp is calculated. Here, f<1, e.g. f=0.8. After the actuator 130 has been fully ventilated, the power supply to the solenoid valve 140 is interrupted from time $t_1$. Thereby the solenoid valve should switch from its operating position to the safety position. This interrupts the compressed air supply to the actuator 130 via the control line 160 and opens a connection to the atmosphere, so that the pressure in the actuator 130 should drop to ambient pressure.

At this point, two cases can occur:

Either the pressure difference dp or, preferably, f*dp is reached and the pressure in the actuator 130 has been decreased to an appropriate level $$p_r=p_1-f*dp$$

(the specified reference pressure, shown by the dotted line). This means that the solenoid valve is working as required, so the test is considered passed.

Or a predetermined point in time is exceeded without the pressure level $p_r$ being reached. Then the test is considered failed.

After one of these cases occurs, the solenoid valve is energized again, causing it to switch to the operating position.

Figure 2:
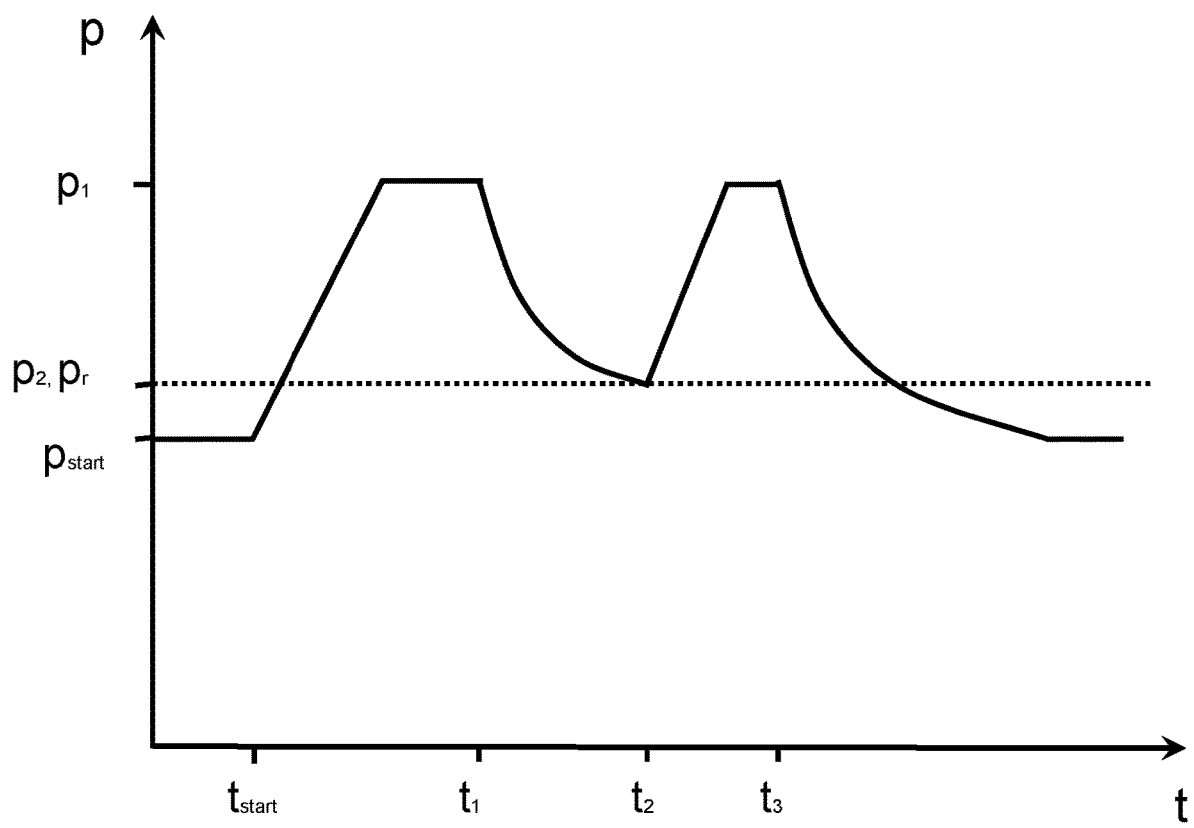
FIG. 2 shows a curve schematically illustrating the pressure over time in the actuator of a safety valve when a variant of the method according to the disclosure is performed.

FIG. 2 shows the first case—test passed—for the variant of the process in which the pressure is continuously monitored. The required pressure level $p_r$ has already been reached at time $t_2$. At this point, the test is aborted, i.e. it is not continued until the predetermined point in time. The abort pressure $p_2$, which is reached at the end of this test procedure, is therefore (if passed) equal to the reference pressure $p_r$. The predetermined point in time is determined from the stored reference values for the reduction of the pressure difference—if any are available—as indicated above.

Figure 3:
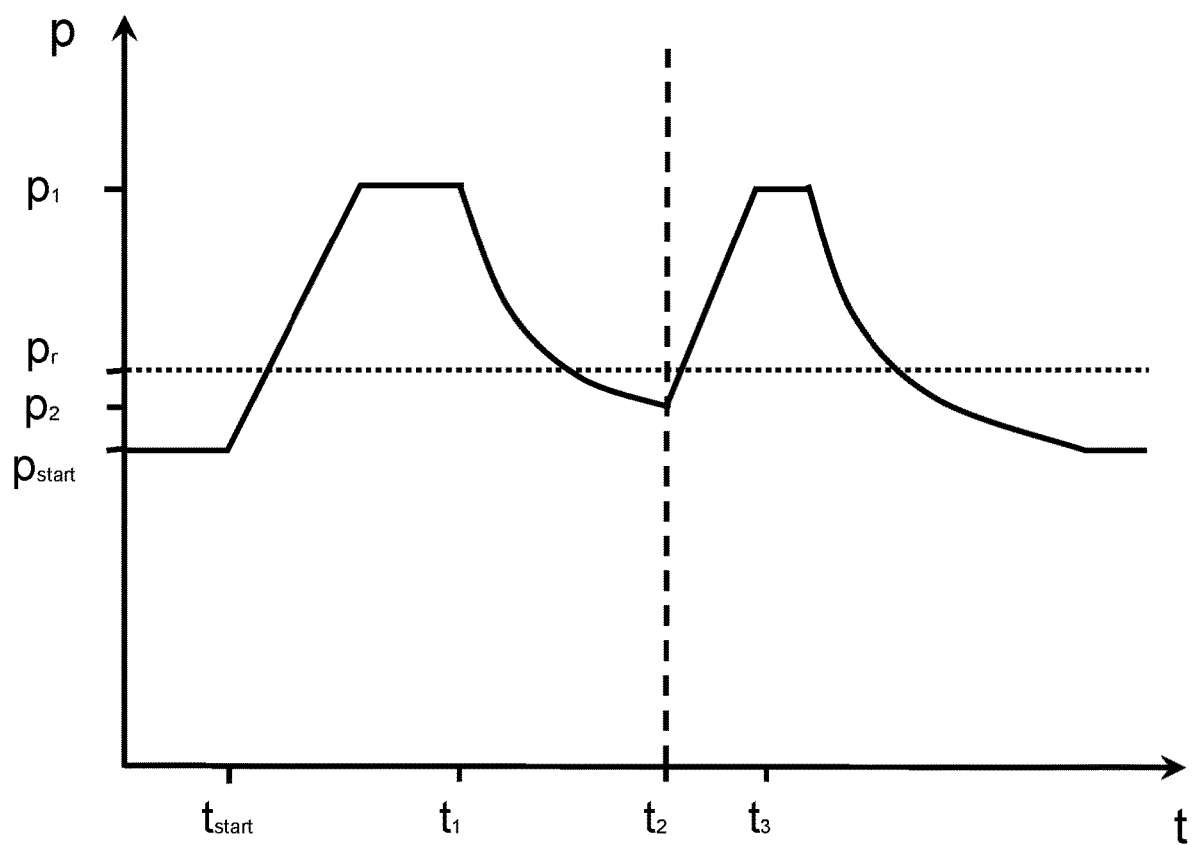
FIG. 3 shows a curve schematically illustrating the pressure over time in the actuator of a safety valve when a simplified variant of the method according to the disclosure is performed.

The schematic pressure curve of a simplified variant of the method according to the disclosure can be seen in FIG. 3. Continuous pressure measurement is not used here. The pressure is measured only at the predetermined point in time $t_2$ (dashed line in FIG. 3), at which the test ends. The pressure $p_2$ at this time is—in the case that the test was passed—lower than the reference pressure $p_r$, which was already undercut before. However, the specifications for the time $t_2$ and the relevant pressure differences still ensure that the final pressure $p_2$ is above the operating pressure $p_{start}$.

The position of the valve member remains unchanged during this process, especially because $p_2$ is above $p_{start}$. This is ensured by the factor f. The time period during which the solenoid valve was switched to the fail-safe position is measured. The test is performed until the pressure in the actuator 130 has dropped by the required difference f*dp (then it is considered passed), or until a time limit defined by the predetermined point in time has been exceeded—then it is considered failed.

In this case, but also if the air flow rate should have changed by a specified amount, a warning signal can be output.

Further diagnostic information can be provided by acoustic signals (e.g. clacking or hissing) and/or a recorded current curve of the solenoid valve. In particular, the recorded current curve when the solenoid valve is switched to the safety position can provide information about the state of wear of the solenoid valve.

After the solenoid valve 140 is switched back to the operating position, the pressure in the actuator 130 increases again because the control line 160 is still connected to the compressed air supply 150. After the test of the operability of the solenoid valve has been completed, the positioner 120 regulates the pressure in the actuator back to the operating pressure $p_{start}$ in order to control the position of the valve member again in a normal manner. This is indicated in FIG. 2 for times after $t_3$.

In a practical application, for example, the compressed air system can provide a supply pressure of 4 bar. The operating pressure in the actuator would then be 2 bar, for example. The pressure difference is then dp=2 bar. As already described, this pressure difference is multiplied by a factor smaller than 1 in order to particularly reliably prevent movement of the valve actuator during the test. For example, the factor f=0.8. Then f*dp=1.6 bar and thus 0.4 bar pressure reserve is available up to the range in which a movement of the valve actuator—e.g. in case of further pressure fluctuations or other disturbances—could begin.

The positioner can receive the command to initiate the solenoid valve operability test according to the disclosure by means of a communication protocol (e.g. HART signals, radio signals, Advanced Physical Layer/APL, Profibus, etc.) or by means of a binary signal or by local operation.

Glossary

Fluidic Drive of a Valve

A valve is referred to as fluidically actuated or driven if the actuator stem of the valve is moved by a diaphragm which is pressurized by a fluid, typically compressed air, and is thus positioned.

Partial Stroke Test (PST)

To ensure the safe operation of a valve, tests are performed regularly or cyclically to determine whether the valve member does in fact move. For these tests, it is undesirable that the valve moves completely to the safety position in order not to disturb the running operation. In a partial stroke test, the valve member is moved only as far as necessary to ensure that the valve member moves part of the distance without significantly affecting the process of the plant. This also includes testing whether the valve member still disengages from its position or breaks loose. After the partial stroke test, the valve member moves back to its initial position. This test can be used to check the basic movability of the valve member.

Reference Pressure

This is to be understood as a predetermined pressure below which the pressure must fall within a certain time when the method according to the disclosure is performed.

Safety Valve

Safety valves are control valves with an open/close mode of operation and safety-relevant application. Control valves consist of a—typically fluidic—actuator and a movable valve member and are used to regulate a fluid flow. The type of valves can be either rotary valves or globe valves. In the field of safety-related valves, single-acting pneumatic actuators are generally used. The actuators, which are preloaded on one side by spring forces, move independently to a safe position when the actuator is vented, i.e. when the compressed air escapes from the chamber of the actuator. This happens, for example, when a current/pressure (I/P) transducer or a solenoid valve is no longer energized.

In safety valves, the safety valve is often open during normal operation, and in the event of a fault (e.g. power failure), the safety valve closes independently. The compressed air always acts against the spring force. If the actuator is now vented, the valve begins to close as the spring forces are released. The safety position can also be de-energized open (actuator vented) and energized closed (actuator vented). In the safety position, therefore, only the ambient pressure is present in the actuator.

Safety valves are often configured to reach the operating position (e.g. fully open) at an operating pressure that is below the maximum possible pressure in the actuator. This is particularly useful because the maximum available pressure is often subject to greater fluctuations due to the characteristics of the pressure-generating equipment.

Solenoid Valve

A solenoid valve is a valve with an electromagnetic drive. Depending on their design, solenoid valves can switch very quickly.

Valve Member

The valve member is the element that closes the valve when it is pressed onto the valve seat.

REFERENCE SYMBOLS 100 safety valve
110 actual valve; valve housing with valve member
120 positioner
130 drive
140 solenoid valve
150 compressed air supply
160 control line
170 pressure sensor for air supply line
180 pressure sensor for drive pressure
p pressure
$p_1$ maximum pressure
$p_2$ pressure at end of test
$p_{start}$ operating pressure
$p_r$ reference pressure
t time
$t_1$ point in time for switching solenoid valve
$t_2$ end of testing period
$t_3$ transition to regulation for operating pressure
$t_{start}$ begin of test

The invention claimed is:

1. A method for testing the operability of a solenoid valve for triggering a safety valve having a valve member;
   wherein the safety valve has a single-acting fluidic drive for the valve member, which is driven by a drive fluid;
   wherein the safety valve has a positioner that determines the pressure in the drive fluid and controls the position of the valve member;
   wherein the valve member assumes a safety position when the pressure in the drive fluid corresponds to an ambient pressure;
   wherein the valve member assumes an operating position when the pressure in the drive fluid corresponds to an operating pressure;
   wherein the solenoid valve leaves the pressure in the drive fluid unaffected in an operating position;
   wherein the solenoid valve lowers the pressure in the drive fluid in a safety position;
   wherein the method comprises the following steps:
   if the valve member is not in the operating position, moving the valve member to the operating position;
   increasing the pressure in the drive fluid above the operating pressure by a first pressure difference;
   moving the solenoid valve to the safety position in response to a triggering event;
   measuring the pressure in the drive fluid continuously and/or at a predetermined point in time after the triggering event;
   choosing the predetermined point in time such that the pressure in the drive fluid drops at most by the first pressure difference; and either
   considering the test of the operability of the solenoid valve to be failed if the pressure in the drive fluid at the predetermined point in time is higher than an associated reference pressure; or
   considering the test of the operability of the solenoid valve to be passed and aborting the test of the operability of the solenoid valve as soon as the pressure during continuous measurement before or at the predetermined point in time is lower than the reference pressure.

2. The method according to claim 1,
   wherein the first pressure difference is the difference between a maximum possible pressure in the drive fluid and the operating pressure.

3. The method according to claim 2, further comprising:
   determining the first pressure difference after the drive was pressurized to the maximum possible pressure and this pressure was measured.

4. The method according to claim 1, further comprising forming a second pressure difference by multiplying the predetermined first pressure difference by a factor;
   wherein the factor being greater than zero and less than 1; and
   wherein that the at least one predetermined point in time is selected such that the pressure in the drive fluid decreases at most by the second pressure difference.

5. The method according to claim 4,
wherein the reference pressure is higher than the operating pressure and is determined with the aid of the second pressure difference.

6. The method according to claim 1,
wherein the drive for the valve member is pneumatic.

7. The method according to claim 1, further comprising:
using a first execution of the method on the solenoid valve of the safety valve as a reference measurement;
measuring or setting the operating pressure and the first pressure difference in the drive of the safety valve and storing the operating pressure and the first pressure difference as reference values;
determining and storing as a reference value the time required for the pressure in the drive to drop by the first pressure difference; and
obtaining a maximum value for the at least one predetermined point in time.

8. The method according to claim 1, further comprising:
considering the test of the operability of the solenoid valve as passed if the pressure in the drive fluid is lower than the reference pressure at the at least one predetermined point in time.

9. The method according to claim 1, further comprising:
considering the test of the operability of the solenoid valve as passed when, in addition, an acoustic signal or a current curve of the solenoid valve proves the operability thereof.

10. The method according to claim 1, further comprising:
running the method on the positioner.

11. The method according to claim 1,
wherein pressure sensors for measuring the pressure in the drive fluid are provided in the positioner.

12. The method according to claim 1,
comprising the following further steps:
after testing the operability of the solenoid valve, moving solenoid valve to the operating position in response to a triggering event; and
wherein the positioner again controls the position of the valve member, and returning the pressure in the drive fluid to the operating pressure.

13. The method according to claim 1,
comprising the following further step:
performing a partial stroke test on the safety valve.

14. The method according to claim 1,
wherein the method steps are formulated as program code, with which the method is executable on at least one computer.

15. A non-transitory computer-readable medium having stored thereon program instructions that upon execution by a processing unit, a microcontroller, DSP, FPGA or computer or on a plurality thereof in a network cause performance of a set of steps according to the method of claim 1.

16. The non-transitory computer-readable medium according to claim 15, wherein the first pressure difference is the difference between a maximum possible pressure in the drive fluid and the operating pressure.

17. The non-transitory computer-readable medium according to claim 15, the set of steps further comprising determining the first pressure difference after the drive was pressurized to the maximum possible pressure and this pressure was measured.

18. The non-transitory computer-readable medium according to claim 15, the set of steps further comprising:
forming a second pressure difference by multiplying the predetermined first pressure difference by a factor;
wherein the factor being greater than zero and less than 1; and
wherein that the at least one predetermined point in time is selected such that the pressure in the drive fluid decreases at most by the second pressure difference.

19. The non-transitory computer-readable medium according to claim 15, wherein the drive for the valve member is pneumatic.

20. The non-transitory computer-readable medium according to claim 15, the set of steps further comprising:
using a first execution of the method on the solenoid valve of the safety valve as a reference measurement;
measuring or setting the operating pressure and the first pressure difference in the drive of the safety valve and storing the operating pressure and the first pressure difference as reference values;
determining and storing as a reference value the time required for the pressure in the drive to drop by the first pressure difference; and
obtaining a maximum value for the at least one predetermined point in time.

* * * * *